US009663375B2

(12) United States Patent
Berry et al.

(10) Patent No.: US 9,663,375 B2
(45) Date of Patent: May 30, 2017

(54) PROCESSES FOR THE RECOVERY OF FLUORIDE AND SILICA PRODUCTS AND PHOSPHORIC ACID FROM WET-PROCESS PHOSPHORIC ACID FACILITIES AND CONTAMINATED WASTE WATERS

(71) Applicant: K-TECHNOLOGIES, INC., Lakeland, FL (US)

(72) Inventors: William W. Berry, Lakeland, FL (US); Thomas E. Baroody, Lakeland, FL (US)

(73) Assignee: K-Technologies, Inc., Lakeland, FL (US)

( * ) Notice: Subject to any disclaimer, the term of this patent is extended or adjusted under 35 U.S.C. 154(b) by 283 days.

(21) Appl. No.: 14/416,261

(22) PCT Filed: Jul. 21, 2013

(86) PCT No.: PCT/US2013/051414
§ 371 (c)(1),
(2) Date: Jan. 21, 2015

(87) PCT Pub. No.: WO2014/018419
PCT Pub. Date: Jan. 30, 2014

(65) Prior Publication Data
US 2015/0166352 A1    Jun. 18, 2015

Related U.S. Application Data

(60) Provisional application No. 61/674,298, filed on Jul. 21, 2012.

(51) Int. Cl.
  *C01B 33/00* (2006.01)
  *C01B 33/10* (2006.01)
  (Continued)

(52) U.S. Cl.
  CPC .............. *C01B 33/103* (2013.01); *B01J 41/05* (2017.01); *B01J 41/14* (2013.01); *B01J 49/57* (2017.01);
  (Continued)

(58) Field of Classification Search
  None
  See application file for complete search history.

(56) References Cited

U.S. PATENT DOCUMENTS 4,125,594 A * 11/1978 Su ........................... C01B 7/198
                                                    210/683
4,734,200 A * 3/1988 Berry .................... B01J 41/043
                                                    210/677

(Continued)

*Primary Examiner* — Chester Barry
(74) *Attorney, Agent, or Firm* — Greer, Burns & Crain, Ltd.; Gregory P. Einhorn (57) ABSTRACT

In particular, in alternative embodiments, the invention provides for a method to recover silicofluoride and phosphate species from wastewaters, or barometric condenser waters, that are typically utilized in wet-process phosphoric acid facilities. The species are recovered via a continuous ion exchange approach that allows for economic recovery of the materials and especially with the silicofluoride component allows for the production of valuable industrial materials such as hydrofluoric acid and other fluoride salts as well as industrial-grade precipitated silica materials. Return of the treated waste water to the phos-acid plant allows for optimization of reagent usage.

28 Claims, 2 Drawing Sheets

(51) Int. Cl.
*B01J 41/14* (2006.01)
*C02F 1/42* (2006.01)
*C01C 1/16* (2006.01)
*C01F 7/50* (2006.01)
*C01B 25/222* (2006.01)
*C05B 7/00* (2006.01)
*B01J 41/05* (2017.01)
*B01J 49/57* (2017.01)
*C02F 101/10* (2006.01)
*C02F 101/14* (2006.01)
*C02F 103/10* (2006.01)
*C02F 103/34* (2006.01)

(52) U.S. Cl.
CPC ............ *C01B 25/222* (2013.01); *C01B 33/10* (2013.01); *C01C 1/162* (2013.01); *C01F 7/50* (2013.01); *C02F 1/42* (2013.01); *C05B 7/00* (2013.01); *C02F 2001/422* (2013.01); *C02F 2101/105* (2013.01); *C02F 2101/14* (2013.01); *C02F 2103/10* (2013.01); *C02F 2103/34* (2013.01); *C02F 2303/16* (2013.01)

(56) References Cited

U.S. PATENT DOCUMENTS

| | | | |
|---|---|---|---|
| 5,679,315 A * | 10/1997 | Neuman | C01C 1/162 423/157.2 |
| 2013/0062289 A1 * | 3/2013 | Cote | B01D 61/022 210/723 |

* cited by examiner

PROCESSES FOR THE RECOVERY OF FLUORIDE AND SILICA PRODUCTS AND PHOSPHORIC ACID FROM WET-PROCESS PHOSPHORIC ACID FACILITIES AND CONTAMINATED WASTE WATERS

RELATED APPLICATIONS

This application is a national phase application claiming benefit of priority under 35 U.S.C. §371 to Patent Convention Treaty (PCT) International Application Serial No: PCT/US2013/051414, filed Jul. 21, 2013, which claims benefit of priority to U.S. Provisional Patent Application Ser. No. ("USSN") 61/674,298, filed Jul. 21, 2012. The aforementioned applications are expressly incorporated herein by reference in their entirety and for all purposes.

TECHNICAL FIELD

This invention generally relates to inorganic chemistry and environmental pollution control. In particular, in alternative embodiments, the invention provides processes and methods for the recovery of silicofluorides and phosphoric acid from phosphoric acid-generating plant facilities, for example, from contaminated wastewater systems associated with a phosphoric acid-generating facility, e.g., gypsum and cooling ponds, or recovery from vapors evolved from specific process steps to barometric condensers. In alternative embodiments, the invention provides a subsequent separation of the silica and fluoride to produce purified fluoride and silica products.

BACKGROUND

In phosphate rock sources there are naturally occurring fluoride contaminants that dissolve with the phosphate materials during the reaction of the phosphate rock with an acid. In most of the phosphoric acid processes, sulfuric acid is used to acidulate the rock, which results in the production of phosphoric acid and by-product gypsum (calcium sulfate dihydrate, with the chemical formula $CaSO_4.2H_2O$). This is generally referred to as the "wet" phosphoric acid process.

In the acidulation stage, as the rock is reacted with the sulfuric acid, the fluoride contained in the rock also dissolves into the acid phase. Once the fluoride is in solution it has a relatively high vapor pressure, and a portion of the fluoride will evolve from the acid/gypsum slurry in the form of a silico-fluoride vapor, primarily silicon tetrafluoride ($SiF_4$) and/or hydrofluosilicic acid ($H_2SiF_6$), along with some hydrofluoric acid (HF). Also during the reaction of phosphate rock and sulfuric acid there is heat generated as a result of the reaction.

To maintain the temperature in the reaction system many plants typically use a method referred to as flash cooling to remove heat from the phosphoric acid/gypsum. In this approach the slurry is pumped into a vessel that is under vacuum, and at this reduced pressure the slurry will begin to boil and evaporate water plus other vapors from the slurry, which in turn results in the cooling of the slurry.

The vacuum for the cooler is generally supplied via the use of a so-called barometric condenser, where water (typically from a recirculating cooling pond system) is pumped into a spray-tower-like vessel and the condensing of the water vapor exiting the flash cooler generates a vacuum. This technique is well established in the industry, and thus results in fluoride species from the plant generally ending up in, and contaminating, the associated pond wastewater systems.

In many facilities, a large cooling pond is used to provide the water for the various barometric condensers that are used within the phosphoric acid process. The water leaving the barometric condensers is now warm and the use of a large area cooling pond allows for the cooling of the used water, primarily via evaporation of some of the water in the ponds, and the eventual recycle of the cooled water back to the barometric condensers.

As a result of the fluoride species vapor pressure in the slurry, a portion of the fluoride species will evolve with the water vapor in the flash cooler and combine with the water used to provide vacuum for the cooler. The used barometric condenser water will then begin to accumulate the fluoride species, along with other contaminants such as entrained phosphoric acid. Over a period of time, the fluoride species concentration in the pond water will tend to build up to somewhat of a pseudo-steady-state value.

In most operations, the phosphoric acid produced in the digestion system is evaporated to produce a higher concentration material for use in subsequent fertilizer manufacture or production of merchant grade acid (MGA). These systems are generally operated under vacuum which is supplied via direct contact barometric condensers. As in the flash cooling case, fluoride vapors are evolved during the evaporation step and are collected in the recirculated water used for the condenser. The cool water supplying the barometric condenser heats up as it condenses both water vapor and the accompanying fluoride vapors. This warm water is returned to the pond system for cooling.

Additional fluoride vapors are also emitted from other sections of the process and are typically recovered via the use of a scrubber system, where the vapors are contacted with pond water to "scrub" the contaminants from the vapor stream. Typically, the same water that is used for the barometric condensers in the plant is used for the various scrubbers used for general emissions.

After production of the phosphoric acid, the mixture of gypsum ($CaSO_4.2H_2O$) solids and phosphoric acid ($P_2O_5$) solution is filtered to separate the phosphoric acid from the gypsum. The gypsum is then washed with water, typically from the pond water system, and the wash carried out in a counter-current fashion, with the resulting phosphoric acid ($P_2O_5$)-enriched water added into the phosphate rock/sulfuric acid reaction or digestion circuit. Even though the counter-current washing is efficient, there is still some phosphoric acid lost as a result of entrainment of dilute solution in the moist gypsum cake solids. While the amount is generally small, with the scale of modern phosphoric acid plants, this small loss can still represent an appreciable cost to the operation.

The gypsum by-product is generally discharged into so-called "gypsum ponds". These ponds are relative large since there are roughly 5.5 tons of gypsum produced for every ton of phosphoric acid ($P_2O_5$) produced. Also, as the gypsum "stacks" up in the pond it also entrains some of the contaminated water within the gypsum material itself and acts as somewhat of a storage pile for soluble fluoride species and dilute phosphoric acid that accumulate in the pond water. As a result of this "stacking" effect, the gypsum stack acts as an accumulator of the various contaminants, e.g. fluoride species, dissolved phosphoric acid ($P_2O_5$), etc. Due to the ratio of the gypsum produced to phosphoric acid ($P_2O_5$) produced, and the interaction of the gypsum and cooling ponds, the contaminants will tend to build up to a pseudo steady-state value.

Once the phosphoric acid system has operated for a period of time, the amount of contaminants being stacked with the gypsum will closely approximate the net input of these contaminants into the pond systems. As this occurs, the pond water will exhibit somewhat of a constant contaminant concentration level. The gypsum is continuously acting as a surge reservoir for contaminated pond water and as a result can serve as an on-site inventory source.

Fluoride species can also evolve in other unit operations within the overall complex such as fertilizer production facilities. Again, recirculated pond water is generally used for scrubbing these vapors emitted by the other operations.

Since the majority of the fluoride vapors are evolved in the evaporation systems, there have been previous efforts to recover the fluoride via the installation of so-called fluosilicic acid (FSA) towers. These towers are essentially spray or other form of direct contact towers that are installed between the evaporator vapor discharge and the barometric condenser units. A recirculated stream of fluosilicic acid (FSA) is used to scrub the vapors from the evaporators and produce a more concentrated and higher purity stream of FSA.

Since the use of conventional FSA recovery involves the installation of additional equipment with the vacuum portion of the evaporation system, it can have a negative impact on the operation of the vacuum evaporator because it adds pressure drop into the circuit. Further, any up-sets in the evaporation system or efforts to operate at higher than designed flow rates, which are common in the industry during certain seasons, can result in off-specification FSA. Since FSA is a true by-product of the operation and not a primary product, any detrimental impacts of the FSA recovery operation on the phosphoric acid ($P_2O_5$) operation are generally viewed as negatives.

It would therefore be desirable to have a process which would allow for the recovery of fluorides from the phosphoric acid complex but have no potential negative impacts on the phos-acid operations. Further, in the past the FSA has generally been sold commercially as an FSA solution which has a relatively low unit fluoride value due to the presence of the silica component within the compound. Earlier efforts to separate the fluoride from the silica have used ammonia to precipitate the silica as an amorphous silica material and an intermediate ammonium fluoride solution. This ammonium fluoride can be further treated to produce various fluoride products, but in general the silica produced in the previous processes was of relatively low quality and was not competitive in the higher value industrial silica markets.

Due to the negatives associated with installing FSA recovery equipment within the evaporation system, the recovery of fluoride materials from phosphoric acid sources has been somewhat limited. Industrial economies require fluoride products for a variety of applications, and in many cases countries do not have domestic conventional fluoride sources such as fluorspar. This results in the need to import fluorides, and thus a dependency on a foreign fluoride source is created.

Therefore it would be desirable to have a process for the recovery of fluorides that has no negative impact on the existing phosphoric acid operation and allows for the production of high purity fluoride products as well as an industrially acceptable precipitated silica product. Further, it would be desirable for such a process to be able to recover fluoride species from the pond systems or barometric condenser waters, and which would also allow the phosphoric acid producer to recover not only the current fluoride being produced in the facility but material that had been previously stacked or inventoried in the gypsum and cooling pond systems.

A system that would recover not only the fluoride species from the pond waters but also a portion of the contained phosphoric acid ($P_2O_5$) that is in the water would also be desirable. In this manner the pond systems can now serve as a potentially value-added source of fluoride species and recovered $P_2O_5$ for the phosphoric acid operation.

Further such a system would reduce the costs associated with any wastewater treatment that might be required in the event of excess wastewater build-up in the pond systems. Treatment of the contaminated pond water is well established, but does represent a significant cost that is dependent on the concentration of the fluoride and $P_2O_5$ in the water. Reduction of contained contaminants prior to excess water treatment would significantly reduce the costs associated with water treatment.

SUMMARY

The invention provides processes and methods for the recovery of fluoride species, silica, and phosphoric acid from wastewaters and industrial pond systems. In alternative embodiments, the invention provides methods comprising a continuous ion exchange system which removes the fluoride and phosphoric acid ($P_2O_5$) from the wastewater and industrial pond systems to produce an intermediate silicofluoride solution and a more concentrated $P_2O_5$ solution. In alternative embodiments, this intermediate solution is then further processed to separate the silicofluoride material from the $P_2O_5$ fraction. In alternative embodiments, the $P_2O_5$ fraction is returned to the phosphoric acid plant as recovered phosphoric acid, or processed separately into technical grade $P_2O_5$ acid.

In alternative embodiments, the silicofluoride material is then used to produce a soluble bifluoride salt that is combined with a recycled fluoride salt to produce a solid bifluoride salt. This solid bifluoride can then be calcined (decomposed) to produce high quality anhydrous hydrofluoric acid (HF). The resulting single fluoride salt from the calcining operation is recycled to produce additional bifluoride solids.

The soluble bifluoride solution can also be used to produce a range of industrial fluoride products, such as aluminum fluoride, single and double fluoride salts, and the like.

In alternative embodiments, during the separation of the silica component from the silicofluoride solution to produce the intermediate fluoride solution, the process is such that a higher quality of precipitated silica can be produced. This then allows for both components in the original silicofluoride (Si/F) solution to be separated to produce high quality products from both of the contained components.

In alternative embodiments, the invention provides methods and processes for the simultaneous recovery or removal of a fluoride, a silica and a phosphate contaminant from a sample, and production of a fluosilicic acid (FSA) ($H_2SiF_6$), a phosphoric acid ($P_2O_5$) and a phosphoric acid ($H_3PO_4$), comprising:

(a) providing a continuous ion exchange system comprising an anion exchange resin or material or composition to remove or recover the fluoride, silica and phosphate contaminants, wherein optionally the anion exchange resin or material or composition comprises:

a clear gel Type 1 strong-base anion exchanger, or a PUROLITE A-600 (Purolite, Bala Cynwyd, Pa.), having a gel polystyrene crosslinked with divinylbenzene, or equivalents thereof;

a LEWATIT® K 6462 (Lanxess, Maharashtra, India), or equivalents thereof; or a DOWEX 21K XLT™ or DOWEX 21K 16/300™ (DOW, Midland, Mich.), or equivalents thereof; or a resin, a composition or a material, or a non-resin solid or a semi-solid material, comprising chelating groups, functionalities or moieties that can a fluoride, a silica and a phosphate contaminant from a sample, wherein optionally the compositions comprise beads, wires, meshes, nanobeads, nanotubes, nanowires or other nano-structures, or hydrogels;

(b) providing a liquid or an aqueous sample, or making a liquid or aqueous solution from a sample to be processed, wherein the liquid or aqueous solution is an acidic solution, and optionally the acidic liquid or aqueous solution has a pH at about pH 2, or above pH 2, or pH 2.5, or pH 3, or higher (but remaining acidic);

(c) applying the liquid or the aqueous sample to the anion exchange resin of the continuous ion exchange system under conditions such that fluoride, silica and phosphate contaminants remain on the anion exchange resin to produce an effluent substantially free of fluoride, silica and phosphate contaminants, thereby removing fluoride, silica and phosphate contaminants; and (d) washing of the anion exchange resin with water, followed by regenerating the anion exchange resin with a sulfuric acid solution by applying the sulfuric acid solution the anion exchange resin to regenerate the anion exchange resin and produce an eluate of fluosilicic acid (FSA) ($H_2SiF_6$), phosphoric acid ($P_2O_5$) and phosphoric acid ($H_3PO_4$), wherein the concentration or amount of sulfuric acid applied to the anion exchange resin for the regeneration of the anion exchange resin is in a range of from between about 5%/weight to about 95%/weight, and optionally the sulfuric acid solution has a pH of about 1.0, or a pH between about pH 1.0 and pH 2.0.

In alternative embodiments, the fluoride, silica or phosphate contaminants removed by the anion exchange resin and recovered as an eluate in step (d) comprise a $SiF_6^{-2}$, a $PO_4^{-3}$, a $H_2PO_4^{-1}$ or a $HPO_4^{-2}$ anionic species.

In alternative embodiments, the sample is derived from an environmental source, or a contaminated wastewater system, a cooling pond system, or a wastewater system or cooling pond system associated with a phosphoric acid plant, or a gypsum or a cooling pond system, and optionally the wastewater is pretreated and/or has solids removed before its application to the anion exchange resin.

In alternative embodiments, the concentration or amount of sulfuric acid applied to the anion exchange resin for the regeneration of the anion exchange resin is in a range of from between about 10%/weight to about 25%/weight.

In alternative embodiments, processes of the invention can further comprise concentrating the regeneration solution to a concentration of at least about 20% sulfate content, or between about 20% to 50% sulfate content, or between about 15% to 55% sulfate content, thereby further concentrating the phosphoric acid ($P_2O_5$), with the resulting evolution of the fluosilicic acid (FSA) ($H_2SiF_6$) contaminant along with evaporated water, wherein optionally the concentrating is by a single effect or a multiple effect conventional evaporation system, or by vapor recompression.

In alternative embodiments, processes of the invention can further comprise returning the concentrated phosphoric acid solution to a phosphoric acid plant, or using the concentrated phosphoric acid solution directly as a make-up solution to a fertilizer or a fertilizer operation.

In alternative embodiments, processes of the invention can further comprise recovering the fluosilicic acid (FSA) ($H_2SiF_6$) vapor by contacting with a recirculating stream of water, to produce a concentrated FSA solution.

In alternative embodiments, processes of the invention can further comprise indirectly cooling the recirculating stream of FSA to about 130 degrees F., or about 110 degrees F., or between about 100 to 140 degrees F., or between about 110 to about 130 degrees F., to maintain a temperature that is low enough to minimize any loss of FSA from the recovery system.

In alternative embodiments, processes of the invention can further comprise continuously treating the concentrated FSA stream with a solution of: ammonium hydroxide (optionally recovered ammonium hydroxide), at a concentration the range of between about 5% and 28% as $NH_3$, or in the range of between about 10% to 20% as $NH_3$; and, ammonia (optionally make-up ammonia) between about 25% and 100%, or at about 28% for $NH_3$ or at about 100% for anhydrous $NH_3$ material, to precipitate a hydrated silica material and an ammonium fluoride solution, optionally comprising a silica/ammonium fluoride (AF) slurry. In alternative embodiments, the ammonia solution and make-up ammonia are added rapidly mixed to produce a fast silica precipitation.

In alternative embodiments, processes of the invention can further comprise neutralizing the solution at a pH range of between about pH 7.6 to about pH 9.2, or at a range of about pH 8.1 to about pH 8.8, optionally neutralizing the solution with ammonia.

In alternative embodiments, processes of the invention can further comprise rapidly cooling the resulting silica/ammonium fluoride (AF) slurry in a continuous indirect contact heat exchanger to cool the slurry temperature to a target level within a target period of time, wherein optionally the target temperature for the cooled silica slurry is between about 90° F. to about 125° F., or at a range of between about 100° F. to about 110° F., and optionally the target cooling time is between about 0.5 minutes to about 30 minutes, or between about 1 minute to about 5 minutes.

In alternative embodiments, processes of the invention can further comprise filtering the cooled silica/AF and washing the silica with water to remove entrained AF liquid from the silica.

In alternative embodiments, processes of the invention can further comprise the rapid drying of the filtered silica to produce and industrial high surface area precipitated silica product, wherein the drying time is between about 0.20 minutes to about 10 minutes; or about 0.25 minutes to about 5 minutes; or between about 0.5 minutes and about 2 minutes.

In alternative embodiments, processes of the invention can further comprise separating the AF from the silica and further concentrating the AF solution to decompose the AF and produce a solution of ammonium bifluoride (ABF) and vaporized ammonia for recycle.

wherein optionally the concentrating is by a single effect or a multiple effect conventional evaporation system, or by vapor recompression.

In alternative embodiments, processes of the invention can further comprise reacting the resulting ABF solution from the decomposition step with an alkali fluoride (optionally a sodium fluoride), to produce an insoluble alkali bifluoride (optionally a sodium bifluoride (NaHF$_2$)) and an ammonium fluoride (AF) solution, wherein optionally the AF solution comprises between about 10% and 30% fluoride (F). In alternative embodiments the alkali fluoride comprises an alkali that will produce an alkali bi-fluoride that is insoluble in an ammonium fluoride solution and that will decompose to form an alkali fluoride and hydrofluoride acid (HF) vapor, wherein optionally the alkali comprises a sodium, a potassium or a lithium alkali, and optionally the sodium fluoride can be recycled within the process, and optionally a small amount of make-up alkali may be required and optionally this comprises a sodium carbonate or a sodium hydroxide. In alternative embodiments, processes of the invention can further comprise recovering the HF vapor via cooling with the subsequent production of HF, optionally HF materials, such as anhydrous HF; or, all or a portion of the HF is used to produce an AlF$_3$.

In alternative embodiments, processes of the invention can further comprise reaction of the intermediate ABF solution with an alumina source to produce an aluminum fluoride product, wherein optionally the alumina source comprises an industrial-grade alumina, an Al$_2$O$_3$, or an aluminum hydroxide (Al(OH)$_3$).

In alternative embodiments, processes of the invention can further comprise reacting the intermediate ABF solution with a reagent to produce a fluoride "single-salt" product, wherein optionally the fluoride "single-salt" product comprises a magnesium fluoride (optionally using magnesium oxide or hydroxide or sulfate as the magnesium source), or a potassium fluoride (optionally using potassium hydroxide or carbonate or sulfate as the potassium source), wherein optionally the reagent comprises any cationic-hydroxide or carbonate material, a calcium oxide, a calcium carbonate, a sodium hydroxide, a potassium hydroxide, a magnesium hydroxide/oxide/carbonate, or any combination thereof. In alternative embodiments, the resulting fluoride products comprise a double-salt material, or a K2TiF6; a K2TaF6; a K2ZrF6; a KBF4 and equivalents, and optionally the resulting fluoride products are produced from commercially available non-fluoride raw materials or scrap materials.

In alternative embodiments, processes of the invention can further comprise reacting the intermediate ammonium bifluoride (ABF) solution with a reagent to produce a bifluoride material, and optionally the bifluoride material comprises a potassium bifluoride (optionally using a potassium hydroxide or a carbonate as the K source), a lithium bifluoride (optionally using a lithium hydroxide or a carbonate as the Li source), or equivalents.

In alternative embodiments, processes of the invention can further comprise reacting the ABF solution with an alkali, an alkaline, or a cationic compound, to produce a fluoride salt, optionally to produce: a magnesium fluoride (optionally MgF$_2$ using magnesium oxide or hydroxide or carbonate as the Mg source); a calcium fluoride (optionally CaF$_2$ using calcium oxide; hydroxide or carbonate as the Ca source, optionally a divalent cationic material in the hydroxide or carbonate oxide form is used as the cation source); and equivalents. In alternative embodiments, the fluoride-containing solution source is a purge stream of recycled water that is used in the phosphoric acid plant condensing systems and indirectly cooled via indirect contact in a conventional heat exchanger system with a stream of recycled fresh water obtained from a cooling tower unit.

Figure 1A:
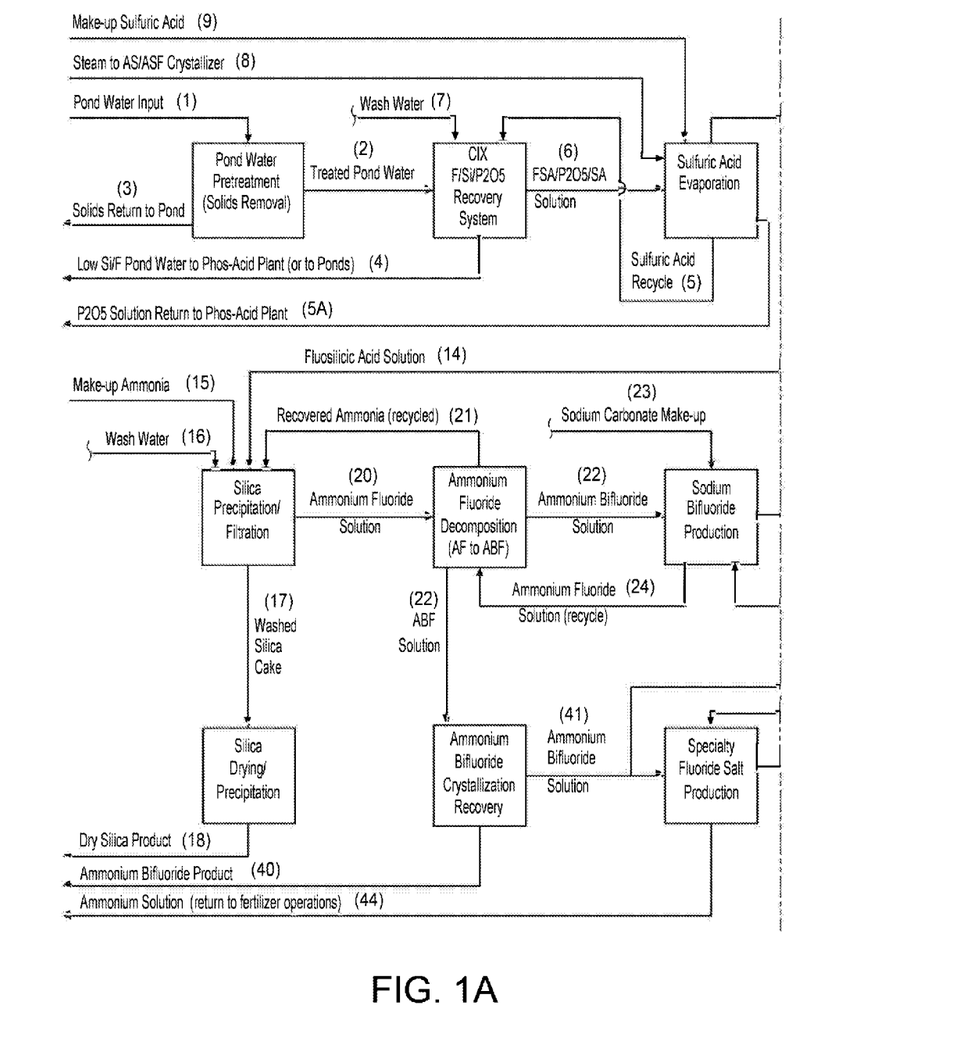
Figure 1B:
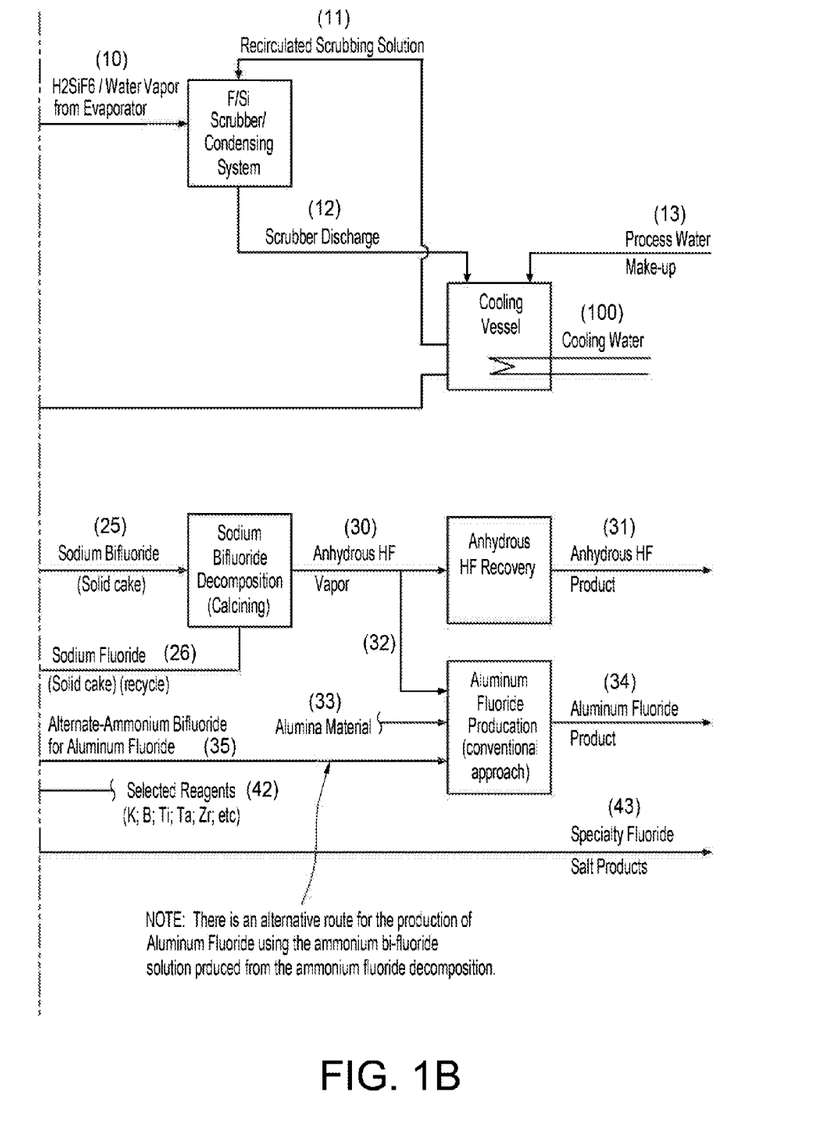

The invention provides industrial processes for the recovery of a fluoride, a phosphoric acid (P$_2$O$_5$), or a silicofluoride from a phosphoric acid-generating plant facility or a contaminated wastewater system associated with a phosphoric acid-generating facility, or a gypsum or a cooling pond, comprising an industrial process as set forth in FIG. 1, or any portion or sub-process thereof.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims.

Figures are described and discussed herein.

FIG. 1 schematically illustrates an exemplary process of the invention, an overall process flow diagram for an exemplary fluoride recovery process of the invention, hereinafter referred to as the "F/Si Recovery from WasteWater" process.

Like reference symbols in the various drawings indicate like elements.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

The invention provides processes and methods for the recovery of fluoride species and phosphoric acid from wastewaters and industrial pond systems. In alternative embodiments, the invention provides methods comprising a continuous ion exchange system which removes the fluoride (F) and phosphoric acid (P$_2$O$_5$) from the wastewater and industrial pond systems, e.g., as the exemplary process illustrated in FIG. 1, in which wastewater from a gypsum/cooling pond system (1), is fed to a Pretreatment System where the water is clarified to allow for removal of any of the larger suspended solids. The solids (3) can be returned to the gypsum pond system and the low solids water (2) is fed forward to the exemplary system, the so-called "CIX F/Si/P2O5 Recovery System" of the invention. This exemplary system comprises a continuous ion exchange unit and the associated peripheries to allow for loading, washing, and regeneration to be carried out in a continuous fashion.

In exemplary embodiments of the so-called "CIX F/Si/P2O5 Recovery System" of the invention, the fluoride species is removed from the pond water as an anionic material using a strong anion resin. The general reaction for this extraction step is as follows:

wherein the R— is the ion exchange resin phase.

In exemplary embodiments, the phosphate materials are removed from the pond water with the same resin as follows:

In exemplary embodiments, the low Si/fluoride (F)/phosphoric acid ($P_2O_5$) pond water is then returned to the phosphoric acid plant as make-up water. Alternatively the treated water can be returned to the pond system.

Using the treated water as a make-up to the phos-acid plant can have distinct advantages in that the sulfuric acid used in the exemplary CIX system (or the exemplary continuous ion exchange process of the invention) for regeneration can be mostly reclaimed via the filter washes and the like. This results in a lower operating cost for the fluoride (F) recovery operation since+$H_2SO_4$ is required in the phos-acid plant, thus the treated water contains a useable material.

From an overall standpoint, using this exemplary ion exchange process of the invention, one mole of $H_2SO_4$ (98 lbs/lb-mole) is required for each mole of hydrofluosilicic acid ($H_2SiF_6$) treated. This results in a sulfuric acid requirement of about 98 lbs $H_2SO_4$/114 lbs F recovered, or about 0.82 lbs $H_2SO_4$/lb of recovered F as HF.

Now consider the production of HF from conventional fluoride sources, such as fluorspar ($CaF_2$) and sulfuric acid. In the traditional route, the fluorspar is reacted with sulfuric acid to form a gaseous hydrofluoric acid stream. The reaction for this general approach is as follows: $CaF_2 + H_2SO_4 => 2\ HF + CaSO_4$. In this traditional HF approach it can be seen that the sulfuric acid requirement is about 98 lbs $H_2SO_4$/40 lbs of HF produced. This is about 2.45 pounds $H_2SO_4$ per pound of HF produced.

This is a significantly greater amount than that needed for this invention's exemplary ion exchange process, thus there can be immediate inherent cost savings associated when using the present invention. In alternative embodiments, in this invention's ion exchange approach, the majority of the $H_2SO_4$ in the treated water can be reused in the phos-acid process, thus actual $H_2SO_4$ requirements are somewhat less than indicated for the ion exchange method.

In alternative embodiments the resin in this invention's exemplary so-called "CIX system" is loaded with $SiF_6^{-2}$ or a $PO_4^{-3}$ anions. The resin is washed with a small amount of water (7) then contacted with a regeneration solution consisting of sulfuric acid (5). The sulfate ion displaces the $SiF_6^{-2}$ or a $PO_4^{-3}$ anions from the resin and results in the production of an intermediate stream of a fluosilicic acid (FSA, or $H_2SiF_6$) and a phosphoric acid ($H_3PO_4$).

In alternative embodiments, the resin is the returned to the sulfate form, and after washing with a small amount of water, the resin is returned to the fluoride and phosphate species extraction step. The general reaction for this regeneration step is as follows:

R2-$SiF_6$+$H_2SO_4$=>R2-$SO_4$+$H_2SiF_6$ for the SiF6 species and

R3-$PO_4$+1.5 $H_2SO_4$=>1.5 R2 $SO_4$+$H_3PO_4$ for the $PO_4$ species

The sulfuric acid with the recovered silicofluoride and phosphate values (6) is next transferred to a Sulfuric Acid Evaporation system. In this stage of the process, the F/Si/$P_2O_5$-containing solution is concentrated and as the concentration increases the Si/F fractions evaporate from the acidic solution along with water vapor. A portion of the concentrated sulfuric acid stream is recycled (5) for regeneration of the resin to the exemplary process, the so-called "CIX system". As the solution continues to recycle, additional $P_2O_5$ is recovered and the concentration of $P_2O_5$ continues to increase since the phosphate solution has a very low vapor pressure.

In alternative embodiments, once the operation achieves steady-state, a small purge stream of the concentrated sulfuric acid/$P_2O_5$ solution (5A) is returned to the phosphoric acid plant. This purge stream contains appreciable quantities of phosphoric acid which represents a direct incremental increase in $P_2O_5$ recovery for the plant. Make-up sulfuric acid (9) is added into the system in the evaporation system.

In alternative embodiments, the Si/F vapor exiting the evaporation system (10) flows to the F/Si Recovery Scrubber/Condensing System. In this step the vapors are contacted with a recirculating solution of fluosilicic acid (FSA) and water (11). The solution scrubs the Si/F vapors from the stream and also allows for a portion of the contained water vapor to condense in order to maintain a specific silicofluoride content in the solution.

In alternative embodiments, the Si/F-containing solution exiting the recovery scrubber system (12) is returned to the Cooling Vessel and cooled via indirect heat exchange. It is then recirculated to the F/Si scrubber. Cooling water for this step (100) is supplied from the existing cooling pond system.

In alternative embodiments, the fluosilicic acid ($H_2SiF_6$ or FSA), solution (14) is then transferred to the Silica Precipitation/Filtration system where recycled ammonium hydroxide (21) and ammonia (15) are added to neutralize the FSA, increase the pH and precipitate the silica from the solution as a precipitated silica compound. This reaction is conducted using a rapid mixing approach on a continuous basis to precipitate the silica quickly at a controlled terminal pH of between 8.0 and 8.9, depending on the nature of the silica product required. The general reaction for this step is as follows:

$H_2SiF_6$+6 $NH_4OH$=>6$NH_4F$+Si$(OH)_4$+2$H_2O$

In the reaction approach itself, the FSA solution is transferred to a centrifugal pump inlet along with a stream of recovered ammonium hydroxide solution (21) and make-up ammonia (15). The mixture is intensely mixed in the impellor section of the pump then discharged into a pipe reactor unit and flows through this unit for a specific residence time; in one embodiment, at less than about 10 minutes, or alternatively, at less than about 1 minute.

In alternative embodiments, after the short hold-up period the slurry is transferred to an indirect cooling system and cooled over a relatively short period of time. The cooling is achieved via indirect heat exchange and systems such as shell and tube; wide gap plate heat exchangers and the like are acceptable methods for cooling. The key is rapid cooling, i.e. less than 10 minutes, and preferably less than 2 minutes, from cooling start to finish.

In alternative embodiments, the cooled silica slurry is then filtered. The filtered silica is washed with water (16) then transferred (17) to the Silica Drying/Preparation system where the material is dried, via spray drying or other flash drying-type system, then stored for packaging and shipment as technical-grade precipitated silica products (18).

In alternative embodiments, the ammonium fluoride solution (20) generated in the silica precipitation system is transferred to the Ammonium Fluoride Decomposition (AF to ABF) system. In this step, the ammonium fluoride solution is evaporated to increase the salt concentration. As the AF concentration increases, the ammonium fluoride will decomposes and the salt will convert to a bifluoride form as follows:

2 $NH_4F$+(heating)=>$NH_4FHF_2$+$NH_3$(vapor)

In alternative embodiments, the ammonia evolved from the decomposition reaction is recovered and recycled to the silica precipitation circuit. The resulting ammonium bifluoride, NH4HF2 or ABF, (22), is transferred to the Sodium

Bifluoride Production step. In this step, the ABF is mixed with recycled sodium fluoride, NaF (26), and an insoluble sodium bifluoride, NaHF2 or SBF, is produced as follows:

$$NH_4F\ HF_2 + NaF \Rightarrow NaHF_2\ (solid) + NH_4F$$

Other alkali fluoride salts may be used for this step, such as potassium fluoride and the like provided that the resulting alkali bifluoride salt is insoluble in a solution of ammonium fluoride and further that the alkali bifluoride will decompose to produce an HF vapor and solid alkali fluoride suitable for recycle to the bifluoride production stage.

In alternative embodiments, the ammonium fluoride solution (24) is recycled to the ammonium fluoride decomposition step to return the AF to its bifluoride form. The sodium bifluoride solids (25) are then transferred to the Sodium Bifluoride Decomposition stage. In this step the sodium bifluoride is heated and the material decomposed to produce an anhydrous hydrofluoride acid vapor (30) and a sodium bifluoride solid (26) which is recycled to the Sodium Bifluoride Production step. The decomposition reaction is as follows:

$$NaHF2 + (heat) \Rightarrow HF(vapor) + NaF$$

In alternative embodiments, the HF vapor is process to recover the HF as an anhydrous product. Alternatively, HF solutions (e.g. 70% HF) could be produced if need be. This HF can be sold as a primary product (31) or alternatively used for the production of other salts such as aluminum fluoride, $AlF_3$.

In alternative embodiments, for aluminum fluoride production, the HF is mixed with an alumina source (33) to produce the $AlF_3$ solids. This technique, i.e. direct reaction of alumina with HF, is used in various conventional aluminum fluoride production methods. The aluminum fluoride product (34) can then be used as a commercial product.

Aluminum fluoride can also be produced via the reaction of the intermediate ammonium bifluoride (35) with an alumina source (33). In this case, the aluminum fluoride is precipitated from the solution and then filtered, washed and dried to product the $AlF_3$ product (34). The ammonium solution resulting from this reaction is recycled. Another alternative available for the production of value-add materials is to utilize a portion of the intermediate ammonium bifluoride solution (22) and further concentrate it to produce a dry ammonium bifluoride product. In this scenario, the ABF solution is concentrated to crystallize ammonium bifluoride ($NH_4HF_2$). This material is then filtered, dried and can be used or sold as an ammonium bifluoride product (40). There are various industrial applications where ABF may be preferred as a fluoride source over HF and this option allows the producer to supply this market.

Yet another alternative is to take a portion of the concentrated ABF (41) and combine it with selected reagents (42) to produce a range of fluoride single and double salt products. As an example, consider the option wherein the double salt potassium titanium fluoride is the desired target product.

In alternative embodiments, the ABF solution is combined with a titanium source, such as rutile, ilmenite, etc. and a potassium source, such as potassium sulfate, to produce a double salt of K2TiF6. Likewise, with the appropriate reagent make-ups, materials such as potassium tantalum fluoride (K2TaF6); potassium zirconium fluoride (K2ZrF6); potassium fluoborate (KBF4); potassium bifluoride (KHF2); potassium fluoride (KF); and the like can be produced from the intermediate fluoride source as specialty fluoride salt products (43).

In alternative embodiments, the production of the specialty fluoride salts will result in a co-product ammonium solution, such as ammonium sulfate. In most phosphate complexes this material can be returned (44) to the fertilizer operations for incorporation in the various ammonium products, such as diammonium phosphate (DAP).

The application of this invention to existing and future wastewater, e.g., pond water, sources associated with phosphoric acid complexes allows for the production of strategic materials and recovers valuable resources which are currently being wasted. In addition, the process allows for increased $P_2O_5$ recovery, as a weak phosphoric acid solution, via the recovery of the $P_2O_5$ losses from the phosphoric acid plant that end up in the pond water.

Another alternative that can be utilized with this processing approach is a barometric condenser contacting approach whereby the barometric condenser discharge water is transferred to an indirect heat exchanger and contacted (indirectly) with a stream of cool, fresh water that has been obtained from a conventional cooling tower system. The barometric condenser water is cooled (indirectly) then recycled to the barometric condensers for reuse. The warm cooling tower water is returned to the cooling tower for cooling and reuse.

In this manner, the need for cooling pond systems, (with associated handling and potential emission problems) is eliminated. This could represent a significant advantage to some types of operations.

The use of recycled barometric condenser water has been considered attractive but to date the problem has been that fluoride will continue to build up in the barometric condenser water and eventually its effectiveness will be reduced. Typically as the fluoride concentration increased, barometric condenser water would be purged and treated, for instance with lime, to precipitate the fluoride species. This would result in a considerable operating cost for the recycle system.

By application of the present invention, the purge solution from the recycled barometric condenser water can be treated in the continuous ion exchange system for removal of the fluoride. This allows for the purged barometric condenser water to be treated for fluoride removal and then reused. Recovery of the fluoride via the CIX approach is economically attractive thus the applicability of the recycle barometric condenser water method can now be realistically considered. The fluoride recovered from the barometric condenser water via the CIX system would be processed in the same manner as the fluoride recovered from the pond water systems.

A number of embodiments of the invention have been described. Nevertheless, it will be understood that various modifications may be made without departing from the spirit and scope of the invention. Accordingly, other embodiments are within the scope of the following claims.

What is claimed is:

1. A process for the simultaneous: (i) recovery of a fluoride, a silica and a phosphate contaminant from a sample, and (ii) production of fluosilicic acid (FSA) ($H_2SiF_6$), diphosphorus pentoxide ($P_2O_5$) and phosphoric acid ($H_3PO_4$), comprising:
   (a) providing a continuous ion exchange system comprising an anion exchange resin to recover the fluoride, silica and phosphate contaminants;
   (b) providing a liquid or an aqueous sample, or making a liquid or aqueous solution from a sample to be processed, wherein the liquid or aqueous solution is an acidic solution;

(c) applying the liquid or the aqueous sample to the anion exchange resin of the continuous ion exchange system under conditions such that fluoride, silica and phosphate contaminants remain on the anion exchange resin to produce an effluent substantially free of fluoride, silica and phosphate contaminants, thereby removing fluoride, silica and phosphate contaminants; and (d) washing of the anion exchange resin with water, followed by regenerating the anion exchange resin with a sulfuric acid solution, wherein regenerating the anion exchange resin with the sulfuric acid solution comprises applying the sulfuric acid solution to the anion exchange resin to regenerate the anion exchange resin and produce an eluate of fluosilicic acid (FSA) ($H_2SiF_6$) diphosphorus pentoxide ($P_2O_5$) $P_2O_5$, and phosphoric acid ($H_3PO_4$), wherein the concentration or amount of sulfuric acid applied to the anion exchange resin for the regeneration of the anion exchange resin is in a range of from between about 5% by weight to about 95% by weight.

2. The process of claim 1, wherein:
the fluoride, silica and phosphate contaminants recovered by the anion exchange resin as an eluate in step (d) comprise $SiF_6^{-2}$, $PO_4^{-3}$, and either $H_2PO_4^{-1}$ or $HPO_4^{-2}$ anionic species; or the fluoride-containing solution source comprises a purge stream of recycled water that is used in the phosphoric acid plant condensing systems and is indirectly cooled via indirect contact in a conventional heat exchanger system with a stream of recycled fresh water obtained from a cooling tower unit.

3. The process of claim 1, wherein the sample is derived from: an environmental source; a contaminated wastewater system, optionally a contaminated wastewater system associated with a phosphoric acid generating facility; a cooling pond system; a wastewater system or cooling pond system associated with a phosphoric acid plant or phosphoric acid generating plant facility; a gypsum pond system; or, a cooling pond system, and optionally the wastewater is pretreated and/or has solids removed before its application to the anion exchange resin.

4. The process of claim 1, wherein the concentration or amount of sulfuric acid applied to the anion exchange resin for the regeneration of the anion exchange resin is in a range of from between about 10% by weight to about 25% by weight.

5. The process of claim 1, further comprising concentrating the regeneration solution to a concentration of:
(a) at least about 20% sulfate content,
(b) between about 20% to 50% sulfate content, or
(c) between about 15% to 55% sulfate content,
thereby further concentrating the diphosphorus pentoxide ($P_2O_5$), with the resulting evolution of the fluosilicic acid (FSA) ($H_2SiF_6$) contaminant along with evaporated water,
wherein optionally the concentrating is by a single effect or a multiple effect conventional evaporation system, or by a vapor recompression.

6. The process of claim 5, further comprising returning the concentrated phosphoric acid solution to a phosphoric acid plant, or using the concentrated phosphoric acid solution directly as a make-up solution to a fertilizer or a fertilizer operation.

7. The process of claim 6, further comprising recovering the fluosilicic acid (FSA) ($H_2SiF_6$) vapor by contacting with a recirculating stream of water to produce a concentrated FSA solution.

8. The process of claim 7, further comprising indirectly cooling the recirculating stream of FSA to:
(a) about 130 degrees F.,
(b) between about 100 to 140 degrees F., or
(c) the process of (b), further comprising indirectly cooling the recirculating stream of FSA to between about 110 to about 130 degrees F.,
to maintain a temperature that is low enough to minimize any loss of FSA from the recovery system.

9. The process of claim 7, further comprising continuously treating the concentrated FSA stream with:
(a) an ammonium hydroxide solution at a concentration in the range of:
(i) between about 5% and 28% as $NH_3$, or
(ii) the process of step (a)(i), wherein the ammonium hydroxide solution is in the range of between about 10% to 20% as $NH_3$,
wherein optionally the ammonium hydroxide comprises a recovered ammonium hydroxide; and,
(b) an ammonia solution of:
(i) between about 25% and 100%, or
(ii) at about 28% for $NH_3$ or at about 100% for anhydrous $NH_3$ material,
wherein optionally the ammonia comprises a make-up ammonia,
to precipitate a hydrated silica material thereby forming a silica/ammonium fluoride (AF) slurry.

10. The process of claim 9, wherein the ammonia solution comprises make-up ammonia and is added and rapidly mixed to produce a fast silica precipitation.

11. The process of claim 9, further comprising neutralizing the solution at a pH range of:
(a) between about pH 7.6 to about pH 9.2, or
(b) the process of (a), further comprising neutralizing the cocetrated FSA solution at a range of between about pH 8.1 to about pH 8.8.

12. The process of claim 9, further comprising rapidly cooling the resulting silica/ammonium fluoride (AF) slurry in a continuous indirect contact heat exchanger to cool the slurry temperature to a target level within a target period of time,
wherein optionally the target temperature for the cooled silica slurry is:
(a) between about 90° F. to about 125° F., or
(b) the process of (a), wherein the target temperature for the cooled silica slurry is at a range of between about 100° F. to about 110° F.,
and optionally the target cooling time is:
(a) between about 0.5 minutes to about 30 minutes, or
(b) the process of (a), wherein the target cooling time is between about 1 minute to about 5 minutes.

13. The process of claim 9, further comprising filtering the silica/AF slurry and washing the silica with water to remove entrained AF liquid from the silica.

14. The process of claim 13, further comprising the rapid drying of the filtered silica to produce an industrial high surface area precipitated silica product, wherein the drying time is:
(a) between about 0.20 minutes to about 10 minutes;
(b) the process of (a), wherein the drying time is between about 0.25 minutes to about 5 minutes; or
(c) the process of (a), wherein the drying time is between about 0.5 minutes and about 2 minutes.

15. The process of claim 14, further comprising concentrating the AF solution to decompose the AF and produce a solution of ammonium bifluoride (ABF) and vaporized ammonia for recycle,
  wherein optionally the concentrating is by a single effect or a multiple effect conventional evaporation system, or by vapor recompression.

16. The process of claim 15, further comprising reacting the resulting ABF solution from the decomposition step with an alkali fluoride to produce an insoluble alkali bifluoride and an ammonium fluoride (AF) solution,
  wherein optionally the AF solution comprises between about 10% and 30% fluoride (F),
  and optionally the alkali fluoride comprises a sodium fluoride,
  and optionally the alkali bifluoride comprises a sodium bifluoride ($NaHF_2$).

17. The process of claim 16, wherein the alkali fluoride comprises an alkali element that will produce an alkali bi-fluoride that is insoluble in an ammonium fluoride solution and that will decompose to form an alkali fluoride and hydrofluoric acid (HF) vapor.

18. The process of claim 17, further comprising recovering the HF vapor via cooling with the subsequent production of non-vapor HF,
  and optionally the non-vapor HF comprises an HF material, and optionally the HF material comprises anhydrous HF,
  wherein optionally all or a portion of the HF is used to produce $AlF_3$.

19. The process of claim 15, further comprising
  reacting the ABF solution with an alumina source to produce an aluminum fluoride product,
  wherein optionally the alumina source comprises an industrial-grade alumina, $Al_2O_3$, or aluminum hydroxide ($Al(OH)_3$).

20. An industrial process for the recovery of a fluoride, a silica, and a phosphate contaminant and production of fluosilicic acid, diphosphorus pentoxide, and phosphoric acid from a phosphoric acid-generating plant facility or a contaminated wastewater system associated with a phosphoric acid-generating facility, or a gypsum or a cooling pond, comprising an industrial process as set forth in claim 1.

21. The process of claim 1, wherein the anion exchange resin comprises:
  (a) a clear gel Type 1 strong-base anion exchanger, or a PUROLITE A-600 (Purolite, Bala Cynwyd, Pa.), having a gel polystyrene crosslinked with divinylbenzene, or equivalents thereof;
  (b) a LEWATIT™ K 6462 (Lanxess, Maharashtra, India); or
  (c) a DOWEX 21K XLT™ or DOWEX 21K 16/300™ (DOW, Midland, Mich.), or equivalents thereof.

22. The process of claim 1, wherein the anion exchange resin comprises a resin, a composition or a material, or a non-resin solid or a semi-solid material, wherein the resin, composition, material, non-resin solid or semi-solid material comprises a chelating group, a functionality or a moiety that can chelate a fluoride, a silica and a phosphate contaminant from the sample,
  wherein optionally the composition comprises a bead, a wire, a mesh, a nanobead, a nanotube, a nanowire, or a hydrogel.

23. The process of claim 1, wherein in step (b) the acidic solution has a pH at:
  (i) about pH 2,
  (ii) above pH 2,
  (iii) the process of (b)(ii), wherein the acidic solution has a pH at about pH 2.5, or
  (iv) the process of (b)(iii), wherein the acidic solution has a pH at about pH 3.

24. The process of claim 1, wherein in step (b) the sulfuric acid solution has a pH of: (i) about 1.0, or, (ii) between about pH 1.0 and about pH 2.0.

25. The process of claim 15, further comprising reacting the ABF solution with a reagent to produce a fluoride "single-salt" product,
  wherein optionally the fluoride "single-salt" product comprises magnesium fluoride, calcium fluoride, sodium fluoride or potassium fluoride,
  and optionally magnesium oxide, magnesium hydroxide or magnesium sulfate is a magnesium source,
  and optionally potassium hydroxide, potassium carbonate or potassium sulfate is a potassium source,
  and optionally sodium hydroxide is a sodium source,
  and optionally calcium oxide, calcium hydroxide or calcium carbonate is a calcium source,
  and optionally a divalent cationic material in a hydroxide or a carbonate oxide form is used as a cationic compound source.

26. The process of claim 15, further comprising reacting the ABF solution with a titanium source, a tantalum source, a boron source, or a zirconium source to produce a double-salt material, wherein optionally the double-salt material comprises $K_2TiF_6$; $K_2TaF_6$; $K_2ZrF_6$; $KBF_4$ or a combination thereof,
  and optionally a rutile or an ilmenite is a titanium source,
  and optionally the resulting fluoride products are produced from commercially available non-fluoride raw materials or scrap materials.

27. The process of claim 15, further comprising reacting the ammonium bifluoride (ABF) solution with a reagent to produce a bifluoride material,
  and optionally the bifluoride material comprises potassium bifluoride or lithium bifluoride,
  and optionally a potassium source comprises potassium hydroxide or potassium carbonate,
  and optionally a lithium source comprises lithium hydroxide or lithium carbonate.

28. The process of claim 17, wherein:
  (a) the alkali element is selected from the group consisting of sodium, potassium, and lithium;
  (b) sodium fluoride if present can be recycled within the process; or
  (c) a make-up alkali is added, and optionally the make-up alkali comprises a sodium carbonate or a sodium hydroxide.

* * * * *